R. L. FRINK.
GLASS POT AND KILN.
APPLICATION FILED MAY 11, 1906.

988,454.

Patented Apr. 4, 1911.
3 SHEETS—SHEET 3.

WITNESSES
Warren W. Swartz
R A Balderson

INVENTOR
R. L. Frink
by Bakewell & Byrnes
his attys.

UNITED STATES PATENT OFFICE.

ROBERT L. FRINK, OF BELLE VERNON, PENNSYLVANIA, ASSIGNOR TO WINDOW GLASS MACHINE COMPANY, OF PITTSBURG, PENNSYLVANIA, A CORPORATION OF NEW JERSEY.

GLASS POT AND KILN.

988,454.  Specification of Letters Patent.  Patented Apr. 4, 1911.

Application filed May 11, 1906. Serial No. 316,275.

*To all whom it may concern:*

Be it known that I, ROBERT L. FRINK, a citizen of the United States, residing at Belle Vernon, Fayette county, Pennsylvania, have invented certain new and useful Improvements in Glass Pots and Kilns, of which the following is a full, clear, and exact description, reference being had to the accompanying drawings, forming part of this specification, in which—

Figure 1:
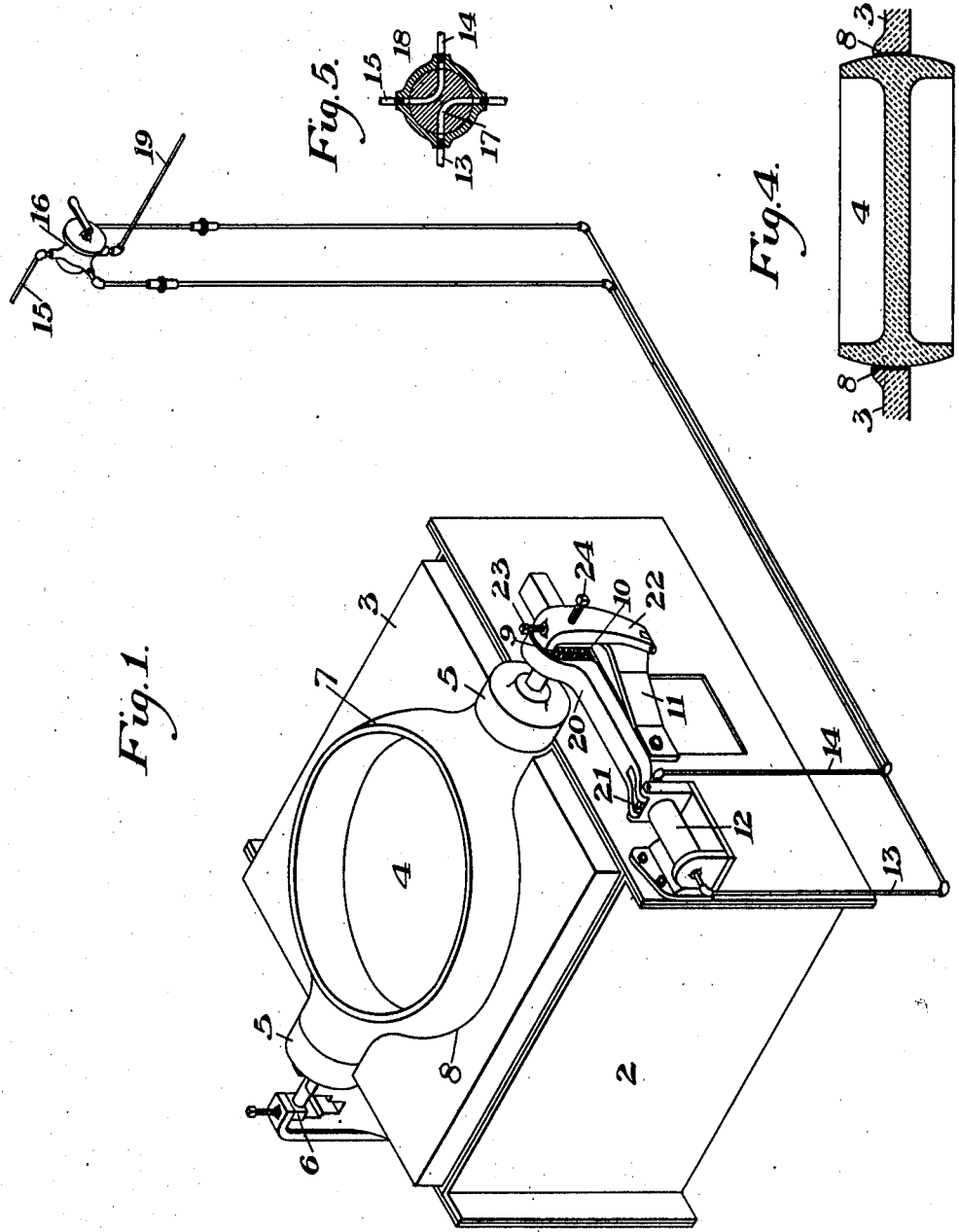
Figure 2:
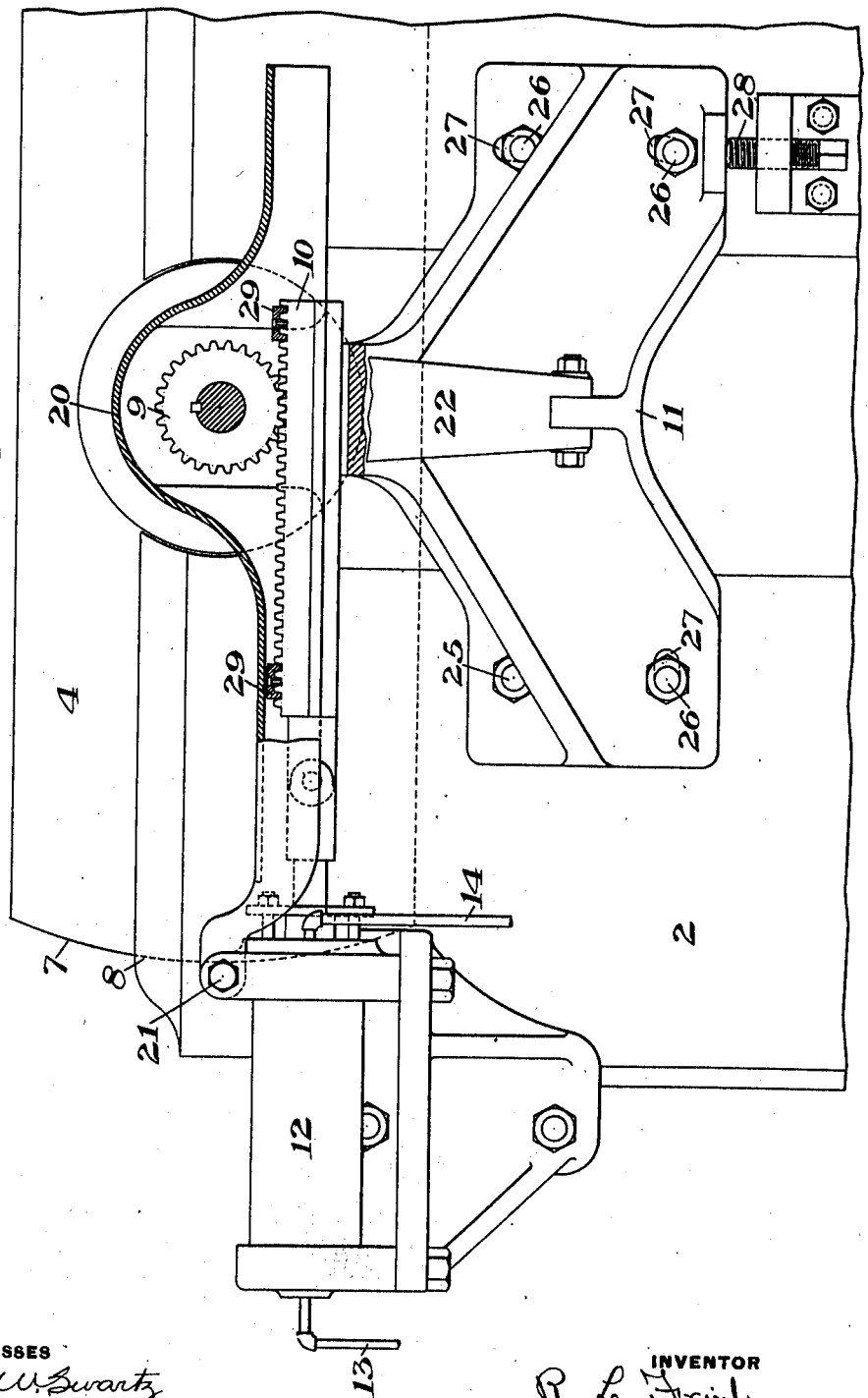
Figure 3:
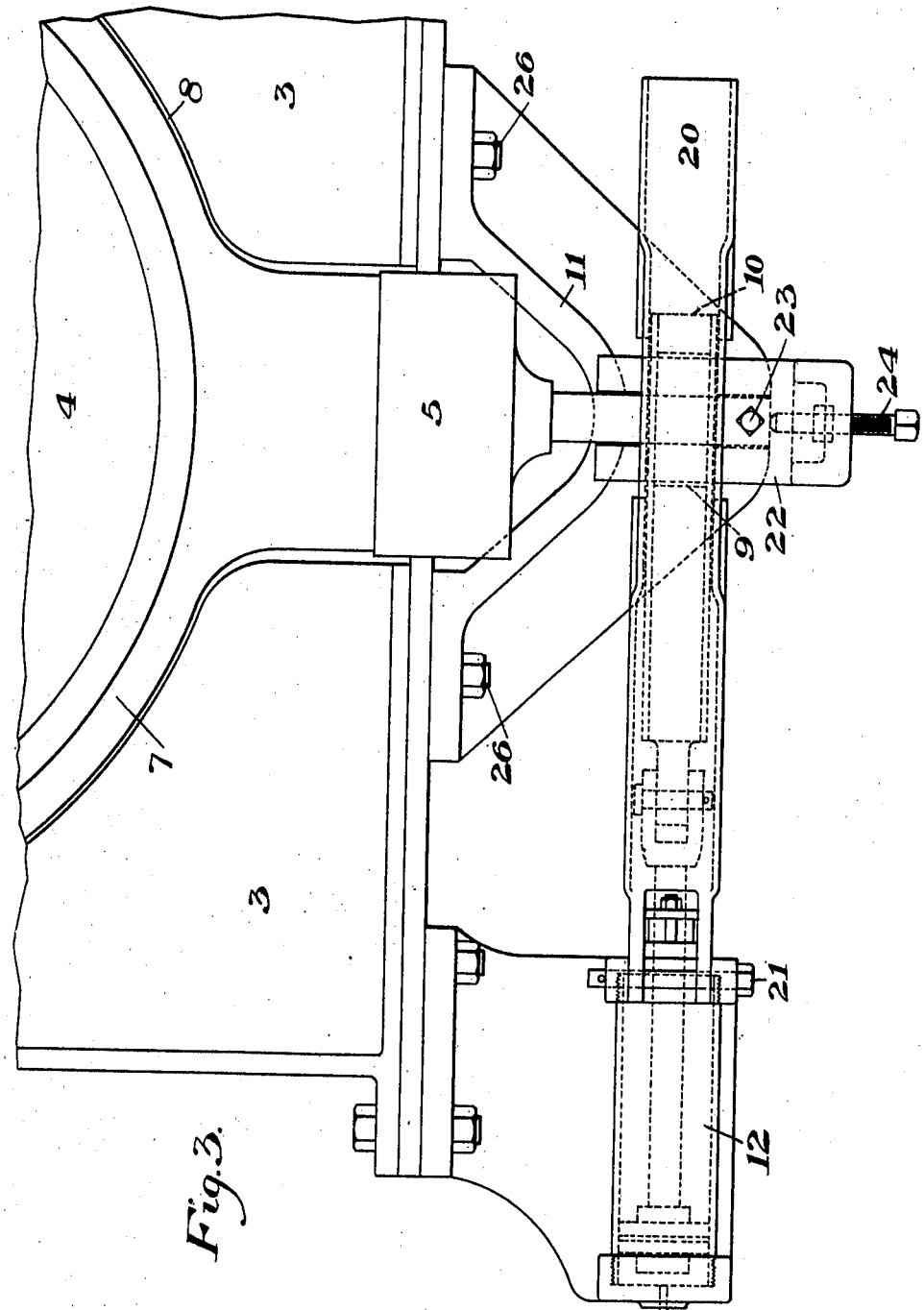

Figure 1 is a perspective view of a glass pot and kiln embodying my invention; Fig. 2 is an end view of the same partly in section; Fig. 3 is a partial plan view; Fig. 4 is a transverse vertical section; and Fig. 5 is a detail sectional view of the cylinder-controlling valve.

My invention has relation to glass pots of the reversible type, and is designed to provide an improved construction of the pot and its kiln so arranged as to facilitate the reversal of the pot, and also to leave the upper portion of the pot freely exposed above the top of the kiln, to provide for the more rapid cooling of the glass as it is drawn and thereby permit an increase in the drawing speed as well as protecting the glass at the drawing point from exposure to the flame in the kiln or furnace.
A further object is to provide power means of simple and effective character for effecting the reversal of the pot and which are arranged to act as a lock to hold the pot in proper position.
With these objects in view, my invention consists in the novel construction, arrangement and combination of parts all substantially as hereinafter described and pointed out in the appended claims.
In the drawing, the numeral 2 designates a kiln or furnace, 3 the top portion, or top stone, of the kiln, and 4 the glass pot which is reversibly supported by the trunnions 5 and bearings 6. The pot is of double form so that it may be used either side up. The outer circumferential face 7 of the pot is made convex, and the adjacent wall of the opening in the top stone which receives the pot is formed with a corresponding cavity 8, only just sufficient clearance between the pot and wall being allowed to permit the pot to turn. The central horizontal plane of the pot is substantially in the plane of the upper surface of the top stone 3, so that substantially the entire portion of the pot which is in use in drawing projects above the top stone and is freely exposed to the atmosphere. By means of this arrangement, the cooling of the glass at the drawing point occurs more rapidly, and the speed of the drawing operation can be proportionately increased. The close interfitting of the pot with the top stone also prevents the escape of flame and gases from the kiln and the contact of the flame with the glass at the drawing point.

For the purpose of effecting the reversal of the pot one of its trunnions is provided with a pinion 9, whose teeth are engaged by the teeth of a horizontal rack-bar 10 which is mounted on the bracket 11 at the end of the kiln, and which is actuated by a power cylinder 12. This cylinder is a double-acting cylinder, supplied by the two pipes 13 and 14, which connect with a main supply pipe 15 through a controlling valve 16. The valve 16, as shown in Fig. 5, is a four-way valve having the two ports 17 and 18, by means of which either end of the cylinder may be connected with the supply-pipe 15, while the opposite end is connected with an exhaust pipe 19. By moving the valve to an intermediate position both ports 17 and 18 may be closed, thus holding the actuating fluid in the cylinder 12 to form a lock to hold the glass pot in its proper level position. Steam, air, water or oil may be used as a motive power, water or oil being preferred.
20 is a pivoted hood for protecting the pinion 9 and rack 10, and which can be moved backwardly on its pivot 21 to permit access to these parts.

22 is a pivoted arm carrying a screw-bolt
23 by means of which the upper bearing block 6 may be adjusted, and also carrying a second screw-bolt 24 which engages the end of the glass pot trunnion and prevents endwise movement of the pot, and forms a means for taking up all wear which may occur between the trunnion and its bearings on the clay of the pot, and also for adjusting the pot to center it with respect to the drawing apparatus. The brackets 11 which carry the bearings 6 are preferably pivotally attached to the kiln to swing on the bolt 25 as a center, the bolt holes for the other securing bolts 26 being slotted as at 27. By means of a screw 28, these brackets may be adjusted to level the glass pot.

29 designates adjustable stops secured to the rack-bar 10 for the purpose of limiting its movement in both directions.

The advantages of my invention consist in the construction of the pot and the kiln, by means of which the free exposure of the upper portion of the pot is obtained, together with the protection of the glass from the flame; and also in the provision of the power means for reversing the pot and for locking it in its proper position.

Various changes may be made in the details by those skilled in the art, without departing from my invention, since

What I claim is:—

1. A glass pot and kiln therefor, the pot having a freely exposed projection above the top of the kiln; substantially as described.

2. A glass pot and kiln therefor, the bottom wall of the pot cavity being at least as high as the top surface of the top of the kiln; substantially as described.

3. A kiln, and a glass pot reversely mounted in the top of the kiln, said pot having a pot cavity at opposite sides with a common bottom wall, the central horizontal plane of said bottom wall being substantially in the plane of the top surface of the kiln; substantially as described.

4. A kiln and a double glass pot reversibly mounted in the top portion of the kiln and having its upper portion projecting above such top in both positions; substantially as described.

5. A kiln and a glass pot reversibly mounted in the top of the kiln, the outer surface of the pot and the wall of the opening therefor having contours concentered about the center of the rotation of the pot; substantially as described.

6. A reversible glass pot, a power cylinder connected to the pot to effect its reversal, and valve means for controlling said cylinder to cause it to actuate the pot and also to lock the pot against movement; substantially as described.

7. A reversibly mounted glass pot, a double-acting power cylinder having an actuating connection with said pot, and a control valve for the cylinder whereby the actuating fluid may be admitted to, exhausted from, or locked in, either end portion of the cylinder; substantially as described.

8. A double glass pot having trunnions, bearings for the said trunnions, and means for moving the pot longitudinally of its axis to center it between its bearings; substantially as described.

In testimony whereof, I have hereunto set my hand.

ROBERT L. FRINK.

Witnesses:
GEO. H. PARMELEE,
GEO. B. BLEMING.